United States Patent [19]
Stoneburner

[11] 3,751,102
[45] Aug. 7, 1973

[54] INGOT CARRYING TRAILER

[76] Inventor: Jerry L. Stoneburner, P.O. Box 277, North Jackson, Ohio 44451

[22] Filed: Dec. 2, 1971

[21] Appl. No.: 204,212

[52] U.S. Cl................ 296/3, 105/367, 105/422, 296/1 R, 296/28 M
[51] Int. Cl............................................ B60p 3/00
[58] Field of Search ............... 296/1 R, 3, 28 M; 105/377, 367, 422

[56] References Cited
UNITED STATES PATENTS

| | | | |
|---|---|---|---|
| 3,540,771 | 11/1970 | Stoneburner | 296/1 R |
| 2,205,154 | 6/1940 | Randolph | 105/377 X |
| 2,201,737 | 5/1940 | Meyer et al. | 105/377 |
| 3,206,946 | 9/1965 | Lindersmith | 296/28 M X |
| 3,540,171 | 11/1970 | Kumnick et al. | 105/377 |

Primary Examiner—Benjamin Hersh
Assistant Examiner—John A. Pekar
Attorney—Webster B. Harpman

[57] ABSTRACT

An ingot carrying trailer particularly adapted for transporting a plurality of hot metal ingots in upright side by side relation includes an elongated frame having a depending center area in which a rack for said ingots is positioned and spaced with respect to an insulated deck therebeneath, insulated closure panels surround said rack and a pair of longitudinally movable insulated cover sections are positioned on a longitudinal track-way for movement toward and away from said depending center area of said trailer.

5 Claims, 3 Drawing Figures

PATENTED AUG 7 1973　　　　　　　　　　　　　　3,751,102

INVENTOR.
JERRY L. STONEBURNER
BY
W B Hanfman
ATTORNEY

INGOT CARRYING TRAILER

BACKGROUND OF THE INVENTION

1. Field of the Invention

This invention relates to trucks and trailers and more particularly to insulated trailer constructions having insulated closure means and adapted to handle hot metal ingots.

2. Description of the Prior Art

The known prior art comprises applicant's U.S. Pat. No. 3,540,771 of Nov. 17, 1970, which discloses an insulated trailer construction wherein a plurality of telescopically slidable insulated cover sections are utilized. No other prior art known can be used for hauling red-hot metal ingots. This invention permits the more rapid loading and unloading of an ingot carrying vehicle by providing improved insulated closures, movable longitudinally of a depending center area in a trailer vehicle so as to completely expose the area in which a plurality of ingots may be carried in upright side by side temperature conserving relation.

SUMMARY OF THE INVENTION

An insulated trailer having an elongated frame including a depending central area with ground engaging wheels on one end of the frame and means for engaging a tractor or truck on the other end thereof has a rack structure including bottom, end, and side frame members on and between which a plurality of ingots may be positioned in upright relation and in engagement with one another. Elevated track-ways support longitudinally movable insulated cover sections and the area about the ingot carrying area is insulated so that the red-hot ingots loaded in the trailer may be hauled without critical temperature loss.

DESCRIPTION OF THE PREFERRED EMBODIMENT

Figure 1:
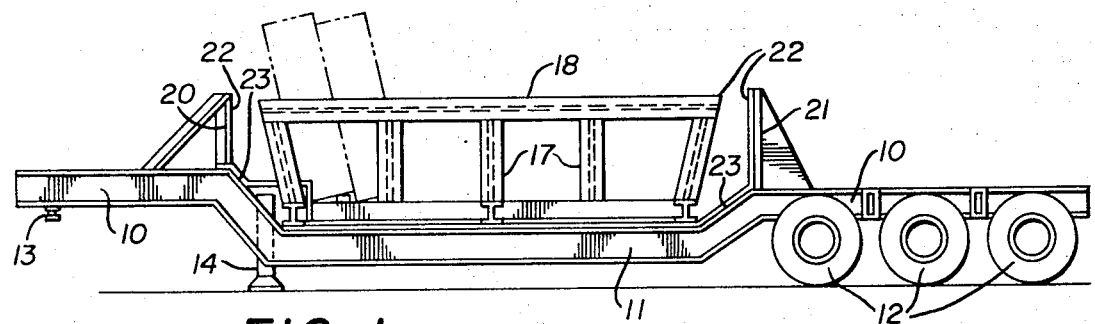
FIG. 1 is a side elevation of the ingot carrying trailer with the insulated panels, track-ways and insulated cover members removed. Broken lines indicate ingots positioned thereon.

By referring to the drawings and FIG. 1 in particular it will be seen that an ingot carrying trailer consists of an elongated frame 10 having a depressed central area 11 with a plurality of ground engaging wheel and axle assemblies 12 positioned under one end of the frame 10 and the other end provided with means 13 for engagement of the fifth wheel of a truck or tractor so that the same can be towed thereby. Retractable supports 14 are illustrated under the forward end of the frame 10 for supporting the same when the trailer is not in position on a truck or tractor.

A rack including longitudinally and transversely extending spaced and crossed structural members 15 and 16 has several vertical frame members 17 thereon defining the sides thereof with the opposite end members being inclined outwardly and upwardly in oppositely disposed relation and longitudinally and transversely extending frame members 18 are secured to the tops of the frame members 17 to complete the upper portion of the rack in which hot ingots may be positioned and supported thereby. (See the broken line illustrations in FIG. 1 and 3 of the drawings).

Outwardly and downwardly inclined braces 19 extend between the longitudinally extending frame members 18 forming the top of the rack and the outer side most portions of the spaced and crossed structural members 15 heretofore referred to. (See FIG. 3 of the drawings).

Still referring to FIG. 1 of the drawings it will be seen that vertical support structures 20 and 21 respectively are formed on the opposite end portions of the frame 10 adjacent the depressed central area 11 and that an insulated wall 22 is positioned thereon. The insulated wall extends down the inclined portions of the depressed central area 11 of the frame 10, as at 23, and extends beneath the rack formed of the structural members 15 and 16 etc. as generally indicated by the numeral 24.

Figure 3:
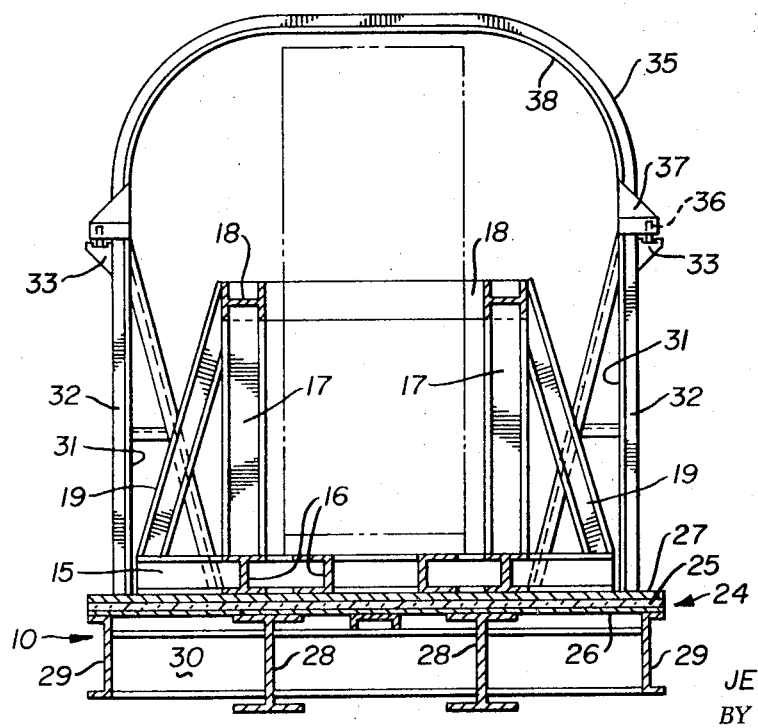
FIG. 3 is a cross sectional elevation on line 3—3 of FIG. 2 on an enlarged scale.

By referring now to FIG. 3 of the drawings it will be seen that the insulated panel forming the floor of the ingot carrying trailer disclosed herein comprises a layer of KAO-WOOL at 25, a stainless steel sheet 26 and a heavy steel plate 27 to which the spaced and crossed structural members 15 and 16 are secured. The insulated floor panel is in turn positioned on a pair of longitudinally extending I beams 28 and edge channels 29 which with transverse spacing members 30 define the elongated frame 10.

Figure 2:
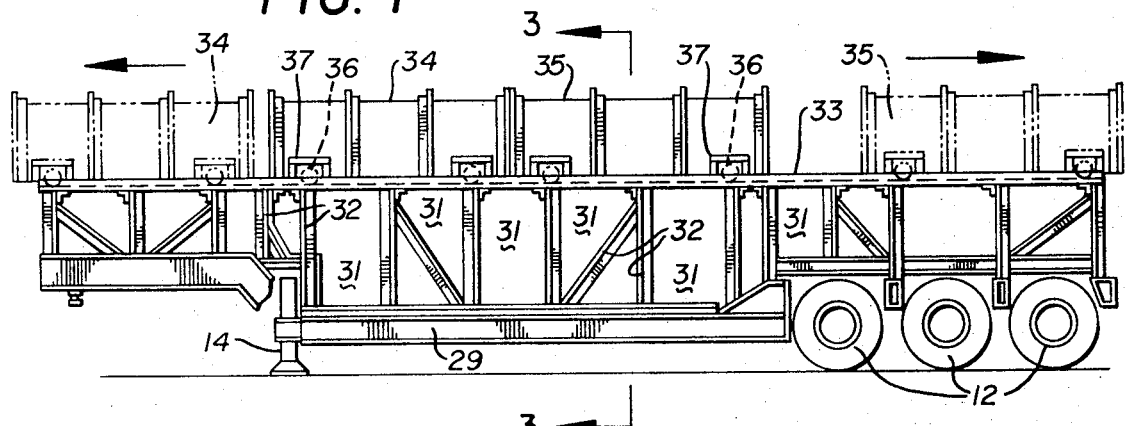
FIG. 2 is a side elevation of the ingot carrying trailer complete with the longitudinally movable cover sections closed and broken lines illustrating the altermate positions of said cover sections.

By referring to FIG. 2 of the drawings it will be seen that the elongated frame 10 and the rack formed of the structural members 15 and 16, the vertical members 17 and the frame members 18 etc. have been enclosed by a plurality of insulated panels 31 supported on a pair of spaced longitudinally extending frames 32 which are in turn positioned on the plate 27 of the insulated floor structure, downwardly and inwardly extending braces 33 support the frames 32 in vertical position and it will be observed that that they form the sides of the insulated trailer as seen in FIGS. 2 and 3 of the drawings. The upper ends of the longitudinally extending frames 32 include track-ways 33 and a pair of longitudinally movable insulated cover sections 34 and 35 are positioned thereon in movable relation by means of a plurality of rollers 36 mounted in roller carrying assemblies 37 secured to the longitudinal edges of the insulated cover sections 34 and 35. The insulated cover sections 34 and 35 are constructed so as to engage one another in sealing relation as shown in solid lines in FIG. 2 of the drawings, when the covers are in closed position and they are each movable longitudinally of the track-ways 33 by reason of their support on the rollers 36 hereinbefore described. Broken line illustrations in FIG. 2 of the drawings show the insulated cover sections 34 and 35 in open position and it will be observed that the entire rack area in the depressed center area of the ingot carrying trailer is thereby uncovered so that the ingots can be quickly loaded into the rack or removed therefrom.

The insulation means in the panels 31 is preferably KAO-WOOL and the same is used to fully insulate the longitudinally movable cover sections 34 and 35 where it is indicated by the reference numeral 38. The insulating material is preferably alumina silicate refractory fiber which is available commercially under the trademarks FIBERFRAX or KAO-WOOL.

Those skilled in the art will observe that steel ingots as removed from an ingot mold or a soaking pit are frequently of a temperature approximating 2,100° F. and that if the ingots are to be reduced the temperature most be largely retained by the ingots when they reach the reduction facilities such as a rolling mill. By hauling the ingots in the trailer disclosed herein the heat of the ingots is largely retained as the entire device is constructed to prevent loss of heat of the ingots. At the same time the structure of the trailer vehicle and the cover sections etc. are protected by the insulation from the high temperatures involved. It will occur to those skilled in the art that the insulated side panels 31 the end panel 22 and the longitudinally movable insulated cover sections is such that they engage one another so as to prevent air leakage through the same which would otherwise cool the ingots being transported.

The above described structure provides relatively easy and fast loading of hot ingots and their rapid covering and permits economical and efficient truck transport of the ingots from their place of formation to a rolling mill or other facility which may therefore be located at some distance from the point of origin.

Although but one embodiment of the present invention has been illustrated and described, it will be apparent to those skilled in the art that various changes and modifications may be made therein without departing from the spirit of the invention.

I claim:

1. A trailer for transporting hot ingots without loss of critical temperature and consisting of an elongated frame having a depressed central area, ground engaging wheels at least under one end of said frame and a rack in said depressed central area thereof for holding said hot ingots in upright side by side relation, said rack consisting of spaced structural members defining an elevated support with respect to said trailer for said hot ingots and vertical frame members with horizontally positioned rails carried thereon and spaced above said support, means for insulating said rack from said elongated frame and an insulated enclosure on said frame around said rack and a pair of longitudinally movable, insulated cover sections for said rack and means on said frame supporting said cover sections in end to end relation for movement therealong.

2. The trailer for transporting hot ingots set forth in claim 1 and wherein the means for supporting said insulated cover sections comprises fixed elevated straight trackways extending along the sides of said rack above and beyond said depressed central area of said elongated frame a distance sufficient to support said insulated cover sections when the same are moved oppositely away from said depressed central area of said trailer and the rack thereon.

3. The trailer for transporting hot ingots set forth in claim 1 and wherein the means for supporting said insulated cover sections and said insulated enclosure around said rack consists of insulated panels and vertical structures on said elongated frame supporting said panels, said vertical structures incorporating horizontal trackways on their upper edges.

4. The trailer for transporting hot ingots set forth in claim 1 and wherein said means for insulating said rack from said elongated frame consists of a bottom layer of reflective metal, a middle layer of alumina silicate refractory fiber and a top steel plate, secured together and positioned on said elongated frame beneath said rack.

5. The trailer for transporting hot metal ingots set forth in claim 1 and wherein said rack incorporates hollow structural members on which said hot ingots rest, the ends of which are open to insure air circulation therethrough.

* * * * *